United States Patent
Yamashita

(10) Patent No.: US 10,466,459 B2
(45) Date of Patent: Nov. 5, 2019

(54) MICROSCOPE SYSTEM

(71) Applicant: OLYMPUS CORPORATION, Hachioji-shi, Tokyo (JP)

(72) Inventor: Yusuke Yamashita, Tokyo (JP)

(73) Assignee: OLYMPUS CORPORATION, Tokyo (JP)

( * ) Notice: Subject to any disclaimer, the term of this patent is extended or adjusted under 35 U.S.C. 154(b) by 565 days.

(21) Appl. No.: 15/162,188

(22) Filed: May 23, 2016

(65) Prior Publication Data

US 2016/0363749 A1    Dec. 15, 2016

(30) Foreign Application Priority Data

Jun. 12, 2015   (JP) ................. 2015-119303

(51) Int. Cl.
*G02B 21/00* (2006.01)
*G02B 21/36* (2006.01)
*G02B 27/10* (2006.01)

(52) U.S. Cl.
CPC ....... *G02B 21/008* (2013.01); *G02B 21/0032* (2013.01); *G02B 21/0076* (2013.01); *G02B 21/367* (2013.01); *G02B 27/1066* (2013.01)

(58) Field of Classification Search
None
See application file for complete search history.

(56) References Cited

U.S. PATENT DOCUMENTS

| | | | |
|---|---|---|---|
| 5,638,119 A | 6/1997 | Cornuejols | |
| 8,933,418 B2 | 1/2015 | Hayashi | |
| 2004/0178356 A1 | 9/2004 | Natori | |
| 2005/0167595 A1* | 8/2005 | Prelewitz | G02B 27/48 250/341.1 |
| 2008/0297597 A1* | 12/2008 | Inomata | G03B 7/00 348/80 |

FOREIGN PATENT DOCUMENTS

| | | | |
|---|---|---|---|
| JP | 05506971 A | | 10/1993 |
| JP | 2001281147 A | * | 10/2001 |
| JP | 2001281147 A | | 10/2001 |

(Continued)

OTHER PUBLICATIONS

Japanese Office Action (and English language translation thereof) dated Oct. 30, 2018 issued in Japanese Application No. 2015-119303.

*Primary Examiner* — William C Vaughn, Jr.
*Assistant Examiner* — Stuart D Bennett
(74) *Attorney, Agent, or Firm* — Holtz, Holtz & Volek PC

(57) ABSTRACT

A microscope system includes a scanner that scans laser light emitted from a continuous-wave light source on a specimen, a beam splitter that splits fluorescence from the specimen into a plurality of light paths with the same wavelength, a plurality of PMTs that respectively detect the fluorescence in the light paths and output light intensity signals, and a computer. Each time the laser light is repeatedly scanned by the scanner, the computer acquires, for each of the PMTs, an image dataset of the specimen based on the light intensity signals. The computer combines a plurality of the image datasets for the same area of the specimen and subjects a final combined image dataset to computational processing for enhancing high-frequency components.

16 Claims, 10 Drawing Sheets

(56) References Cited

FOREIGN PATENT DOCUMENTS

| | | | |
|---|---|---|---|
| JP | 2004110017 A | | 4/2004 |
| JP | 2005057368 A | * | 3/2005 |
| JP | 2005057368 A | | 3/2005 |
| JP | 2008085954 A | | 4/2008 |
| JP | 2011141309 A | | 7/2011 |
| JP | 2013020083 A | | 1/2013 |

* cited by examiner

SUMMATION AND AVERAGING

↓

CONVOLUTION

↓

MICROSCOPE SYSTEM

CROSS-REFERENCE TO RELATED APPLICATIONS

This application is based on Japanese Patent Application No. 2015-119303, the contents of which are incorporated herein by reference.

TECHNICAL FIELD

The present invention relates to microscope systems.

BACKGROUND ART

In the related art, there are known microscope systems that create super-resolution images having a resolution equal to optical resolution or greater by performing convolutional filtering on an image of a specimen obtained by detecting fluorescence from the specimen with a confocal microscope to enhance high-frequency components (for example, see Patent Literature 1).

CITATION LIST

Patent Literature

{PTL1} Japanese Unexamined Patent Application, Publication No. 2013-20083

SUMMARY OF INVENTION

To achieve a resolution equal to optical resolution or greater, it is necessary to detect a fixed number of photons or greater with a high-sensitivity detector (GaAsP etc.), and to remove photon noise, so that the proportion of high-frequency components in the raw image for creating the super-resolution image becomes higher; however, if the laser intensity is raised for increasing the number of photons to be detected, the intensity of the fluorescence emitted from the specimen becomes too high, and the high-sensitivity detector may saturate. Therefore, it is necessary to suppress the laser light intensity to a level that does not cause saturation of the high-sensitivity detector, and it is necessary to detect a fixed number of photons or greater by scanning the laser light multiple times in the same area of the specimen and detecting the fluorescence from the same area of the specimen in each scan.

When observing a living cell, there is a possibility of the observation target moving, and the resolution is thus affected by time; therefore, it is necessary to detect the fixed number of photons or greater in as short a time as possible; with the above method, however, it takes time to repeatedly scan the same area of the specimen, and it is thus difficult to obtain the desired resolution equal to optical resolution or greater.

The present invention provides a microscope system that can detect a fixed number of photons or greater in a shorter time, and that can create a super-resolution image having a desired resolution equal to optical resolution or greater.

An aspect of the present invention is a microscope system comprising: a scanning unit that scans laser light emitted from a light source on a specimen; a light splitting part that splits return light from the specimen on which the laser light is scanned by the scanning unit into a plurality of light paths with the same wavelength; a plurality of photodetector units that respectively detect the return light in the light paths split by the light splitting part and output light intensity signals corresponding to the luminances of the return light; an image-dataset acquisition unit that, for each of the photodetector units, acquires an image dataset of the specimen on the basis of the light intensity signal; an image-dataset combining unit which, by repeatedly scanning the laser light with the scanning unit, combines the plurality of image datasets for the same area of the specimen, which are acquired by the image-dataset acquisition unit on the basis of the light intensity signals of the return light from the same area of the specimen, detected by the photodetector units for each scan; and a computational processing unit that subjects a final combined image dataset, obtained by combining the image datasets with the image-dataset combining unit, to image computational processing for enhancing high-frequency components.

According to this embodiment, by repeatedly scanning the laser light from the light source in the same area of the specimen and detecting the return light from the specimen with each photodetector unit each time the laser light is scanned, it is possible to detect a fixed number of photons or higher without causing saturation of the photodetector unit, as in the case where the laser light intensity is increased and the intense fluorescence is detected one time. Thus, by using the image-dataset combining unit to combine the image datasets for the same area of the specimen acquired by the image-dataset acquisition unit on the basis of the light intensity signal output from each photodetector unit, it is possible to create a final combined image dataset having a high proportion of high-frequency components, from which photon noise has been removed. Therefore, by performing the computational processing on this final combined image dataset with the computational processing unit, it is possible to efficiently enhance high-frequency components in the final combined image dataset.

In this case, although it takes time to repeatedly scan the same area of the specimen, by splitting the return light from the same area of the specimen into a plurality of light paths for the same wavelength and detecting the return light in each photodetector unit, it is possible to shorten the detection time for detecting a fixed number of photons or greater. Therefore, it is possible to create a super-resolution image having a desired resolution equal to optical resolution or higher without the resolution being reduced due to the influence of the detection time.

In the above-described aspect, the image-dataset combining unit may sums or sum and average the acquired plurality of image datasets for the same area of the specimen, in each of the photodetector units, to create the final combined image dataset for the same area of the specimen.

With this configuration, by summing a plurality of image datasets, it is possible to create a final combined image dataset in which photon noise is removed and having a correspondingly higher proportion of high-frequency components, compared with the image datasets for the same area of the specimen for each photodetector unit, acquired by the image-dataset acquisition unit.

In the above-described aspect, the image-dataset combining unit may create a photodetector-unit combined image dataset for each of the photodetector units by summing or by summing and averaging the acquired plurality of image datasets for the same area of the specimen, for each of the photodetector units, and may create the final combined image dataset for the same area of the specimen by summing or by summing and averaging the created plurality of photodetector-unit combined image datasets, for each of the photodetector units.

With this configuration, by repeatedly scanning the laser light, it is possible to create, for each photodetector unit, a photodetector-unit combined image dataset in which photon noise is removed and having a high proportion of high-frequency components according to the repeated scanning of the laser light, and in addition, it is possible to create a final combined image dataset in which photon noise is removed and having a higher proportion of high-frequency components according to the number of photodetector units.

In the above-described aspect, the plurality of photodetector units may comprise photodetector-unit gain adjusting and control units that adjust photodetector-unit gains so that sensitivity characteristics with respect to the number of photons to be detected are approximately the same. In the above-described aspect, the photodetector-unit gain adjusting and control units may obtain other photodetector-unit gains on the basis of one initially selected photodetector-unit gain so that the sensitivity characteristics of the plurality of photodetector units with respect to the number of photons to be detected are approximately the same.

With this configuration, when the return light whose intensity is equally divided by the light splitting part is detected by each photodetector unit, by adjusting the photodetector-unit gain with the photodetector-unit gain adjusting and control unit, it is possible to output approximately the same light intensity signal from each photodetector unit and to obtain approximately the same image datasets for the same area of the specimen, for each photodetector.

The above-described aspect may further include a plurality of detection units having a plurality of the photodetector units and the light splitting parts; and a light-distributing part that distributes the return light coming from the specimen to the plurality of detection units with the same wavelength.

With this configuration, in each detection unit, the return light from the specimen, which is distributed for the same wavelength by the light-distributing part, is split into light paths for the same wavelength by the light splitting part and is detected in each photodetector. Therefore, with these photodetector units, it is possible to detect the photons of intense fluorescence in an even shorter time.

The above-described aspect may further include: a plurality of detection units having a plurality of the photodetector units and the light splitting parts; and a light-distributing part that distributes the return light coming from the specimen to the plurality of detection units according to wavelength.

With this configuration, in each detection unit, the return light from the specimen, which is distributed by the light-distributing part according to the wavelength, is split into light paths for the same wavelength by the light splitting part and is detected in each photodetector unit. Therefore, with these photodetector units, it is possible to detect the photons of intense fluorescence, for each wavelength, in a short time.

In the above-described aspect, the laser light emitted from the light source may be continuous-wave laser light; and the microscope system may further include an objective lens that irradiates the specimen with the continuous-wave laser light, which is scanned by the scanning unit, and that collects the return light returning from the specimen; and a pinhole having an opening at a position that is optically conjugate with the focal position of the objective lens and that allows the return light collected by the objective lens and descanned by the scanning unit to partially pass therethrough, wherein the photodetector units may detect the return light that passes through the pinhole and whose light path is split by the light splitting part.

With this configuration, by radiating the continuous-wave laser light emitted from the light source onto the specimen via the objective lens, among the return light returning from the specimen, only the return light generated at the focal position of the objective lens in the specimen passes through the pinhole, and the return light that has passed through the pinhole is detected by each photodetector unit, for each of the light paths split by the light splitting part. Therefore, by means of single-photon excitation observation, it is possible to create a super-resolution image having a desired resolution equal to optical resolution or higher, and to observe the specimen.

In the above-described aspect, the laser light emitted from the light source may be short-pulse laser light; and the microscope system may further include an objective lens that irradiates the specimen with the short-pulse laser light, which is scanned by the scanning unit, and that collects the return light returning from the specimen; and a light branching part that is disposed between the objective lens and the scanning unit and that branches off the return light coming from the specimen from the light path of the short-pulse laser light; wherein the photodetector units may detect the return light that is branched off by the light branching part and whose light path is split by the light splitting part.

With this configuration, by radiating the short-pulse laser light emitted from the light source onto the specimen via the objective lens, the return light generated at the focal position of the objective lens in the specimen is branched off by the light-branching part without returning to the scanning unit, and the return light branched off by the light-branching part is detected by each photodetector unit, for each of the light paths split by the light-splitting part. Therefore, by means of multi-photon excitation observation, it is possible to create a super-resolution having a desired resolution equal to optical resolution or higher and to observe the specimen.

The present invention affords the advantages that a fixed number of photons or greater can be detected in a shorter time, and a super-resolution image having a desired resolution equal to optical resolution or higher can be created.

DESCRIPTION OF EMBODIMENTS

First Embodiment

A microscope system according to a first embodiment of the present invention will be described below with reference to the drawings.

Figure 1:
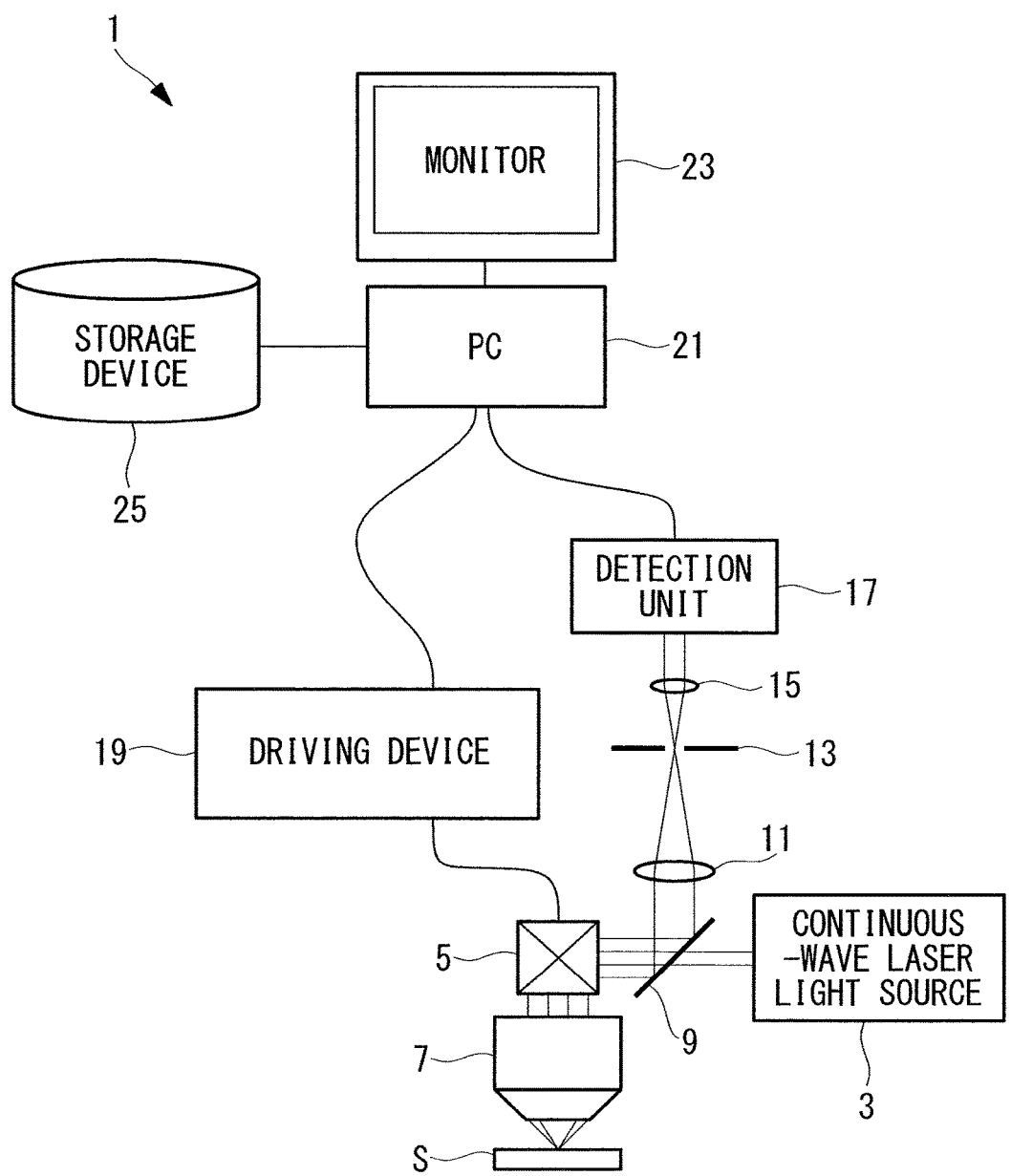
FIG. 1 is a diagram showing, in outline, the configuration of a microscope system according to a first embodiment of the present invention.

As shown in FIG. 1, a microscope system 1 according to this embodiment has a configuration for single-photon excitation observation. That is to say, the microscope system 1 is provided with a continuous-wave laser light source (light source) 3 that generates continuous-wave laser light (hereinafter referred to as "laser light"); a scanner (scanning unit) 5 that deflects the laser light emitted from the continuous-wave laser light source 3; an objective lens 7 that irradiates a specimen S, such as a living cell, with the laser light deflected by the scanner 5 and that collects fluorescence (return light) generated in the specimen S; a dichroic mirror 9 that branches off the fluorescence collected by the objective lens 7 from the light path of the laser light; a confocal lens 11 that focuses the fluorescence branched off by the dichroic mirror 9; a pinhole 13 that restricts the passage of the fluorescence focused by the confocal lens 11; a collimator lens 15 that converts the fluorescence passing through the pinhole 13 to a collimated beam; and a detection unit 17 that detects the fluorescence converted to a collimated beam by the collimator lens 15.

The microscope system 1 is also provided with a driving device 19 that drives the scanner 5; a PC (Personal Computer, image-dataset acquisition unit, image-dataset combining unit, computational processing unit) 21 that controls the detection unit 17 and the driving device 19 and that creates images; a monitor 23 that displays the images created by the PC 21 and so forth; and a storage device 25 that stores observation conditions set by a user.

The scanner 5 includes, for example, a pair of galvanometer mirrors (not illustrated) that are disposed in close proximity to each other and is configured to deflect the laser light from the dichroic mirror 9 with this pair of galvanometer mirrors. The pair of galvanometer mirrors are provided in such a manner that their oscillating angles about axes that intersect the optical axis of the laser light can be controlled. One of the galvanometer mirrors has an oscillating speed that is set to be sufficiently higher than that of the other galvanometer mirror. The higher-speed galvanometer mirror scans the laser light in a main scanning direction (X-axis direction) on the specimen S, and the lower-speed galvanometer mirror moves the scanning position in a sub-scanning direction (Y-axis direction) on the specimen S.

The dichroic mirror 9 transmits the laser light from the continuous-wave laser light source 3 towards the scanner 5 and reflects the fluorescence returning from the specimen S along the light path of the laser light, via the objective lens 7 and the scanner 5, towards the confocal lens 11.

The pinhole 13 has an opening at a position conjugate with the pupil position of the objective lens 7 so that only the fluorescence generated at the focal position of the objective lens 7 in the specimen S is allowed to pass therethrough. The aperture diameter of this pinhole 13 can be changed under the control of the PC 21.

Figure 2:
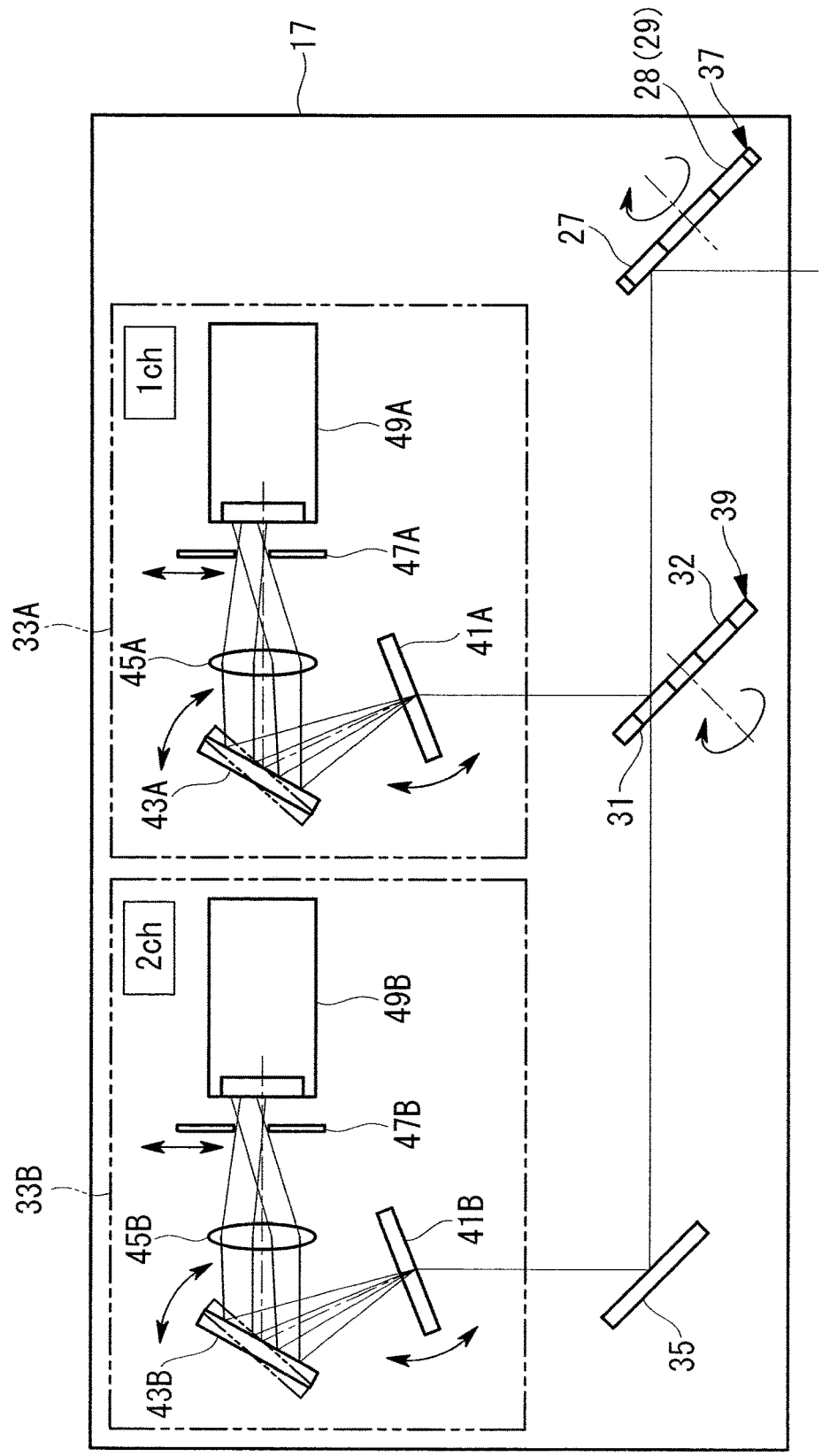
FIG. 2 is a diagram showing, in outline, the configuration of a detection unit in FIG. 1.

As shown in FIG. 2, the detection unit 17 includes a reflective mirror 27 that reflects the fluorescence from the collimator lens 15; a beam splitter (light splitting part) 31 that splits the fluorescence reflected by the reflective mirror 27 into two light paths; a detection unit 33A (1ch) that detects the fluorescence in one of the light paths split by the beam splitter 31; a reflective mirror 35 that reflects the fluorescence in the other light path; and a detection unit 33B (2ch) that detects the fluorescence reflected by the reflective mirror 35.

The reflective mirror 27 is held in a turret 37 that can rotate about a prescribed rotation axis. The turret 37 holds a beam splitter (light-distributing part) 28, a dichroic mirror 29 (light-distributing part) 29, etc., which are located in the circumferential direction with gaps therebetween, together with the reflective mirror 27, and, by and rotating about the rotation axis, can selectively place the reflective mirror 27, the beam splitter 28, the dichroic mirror 29, or the like in the light path of the fluorescence.

The beam splitter 31 is held in a turret 39 that can rotate about a prescribed rotation axis. This beam splitter 31 divides the fluorescence from the reflective mirror 27 into two parts of equal intensity, with the same wavelength, reflects one part of the fluorescence towards the detection unit 33A, and transmits the other part of the fluorescence towards the reflective mirror 35. The turret 39 holds a reflective mirror 32 etc. which are located in the circumferential direction with gaps therebetween, together with the beam splitter 31, and, by rotating about the rotation axis, can selectively place the beam splitter 31, the reflective mirrors 32 or the like in the light path of the fluorescence.

The detection unit 33A and the detection unit 33B have the same configuration. Specifically, the detection units 33A and 33B include gratings (light-dispersing elements) 41A and 41B that disperse the incident fluorescence into individual wavelengths; wavelength-selecting mirrors 43A and 43B that reflect the fluorescence dispersed by the gratings 41A and 41B; image-forming lenses 45A and 45B that focus the fluorescence reflected by the wavelength-selecting mirrors 43A and 43B for each wavelength; slits 47A and 47B that pass only some wavelengths in the fluorescence focused by the image-forming lenses 45A and 45B; and PMTs (Photomultiplier Tubes, photodetector units) 49A and 49B that detect the fluorescence that has passed through the slits 47A and 47B.

By changing the oscillating angles about the prescribed oscillation axes under the control of the PC 21, the wavelength-selecting mirrors 43A and 43B can switch the wavelengths that pass through the slits 47A and 47B, among the fluorescence dispersed into each wavelength by the gratings 41A and 41B.

The PMTs 49A and 49B are high-sensitivity detectors, for example, GaAsP (Gallium Arsenide Phosphide) detectors, which detect the fluorescence that has passed through the slits 47A and 47B and send light intensity signals corresponding to the luminances of this fluorescence to the PC 21.

The PC 21 is a control device (controller) of the microscope system 1 and includes a CPU, a ROM, a RAM, and so forth. The PC 21 stores a program for executing the functions of an image-dataset acquisition unit, an image-dataset combining unit, and a computational processing unit. By reading out and executing this program, the CPU realizes the functions of the image-dataset acquisition unit, the image-dataset combining unit, and the computational processing unit, as described below.

The PC 21 controls the oscillating angle of each galvanometer mirror in the scanner 5, the oscillating angles of the wavelength-selecting mirrors 43A and 43B, the rotation operation of the turrets 37 and 39, and the aperture diameter of the pinhole 13. In addition, the PC 21 creates an image dataset of the specimen S on the basis of the light intensity signals sent from the PMTs 49A and 49B and a scanning-position signal related to the scanning position of the laser beam, corresponding to the oscillating angle of each galvanometer mirror in the scanner 5.

In addition, the PC 21 can selectively execute a normal-observation mode for creating a normal fluorescence-image dataset, and super-resolution mode for creating a super-resolution image dataset in which the resolution is higher than that in the normal fluorescence-image dataset. In the super-resolution mode, after scanning the laser light on the specimen S multiple times in the same scanning line in the main scanning direction by means of the high-speed galvanometer mirror in the scanner 5, the PC 21 moves the scanning position of the laser light in the sub-scanning direction by means of the low-speed galvanometer mirror, the fluorescence from the same scanning line is detected with the PMTs 49A and 49B, and multiple image datasets are acquired for the same area of the specimen S.

The PC 21 sums and averages the acquired multiple image datasets for the same area of the specimen S in each of the PMTs 49A and 49B to create one photodetector-unit combined image dataset for each one. In addition, the PC 21 sums and averages the photodetector-unit combined image datasets created for each PMT 49A and 49B to create a single final combined image dataset. Furthermore, with the created final combined image dataset serving as a raw image, the PC 21 performs image computational processing, in which a convolutional filter is applied for enhancing high-frequency components in this final combined image dataset, to create a super-resolution image.

In addition, in the super-resolution mode, the PC 21 performs automatic setting of the light path conditions and automatic setting of the image-capturing conditions. As for the automatic setting of the light path conditions, for example, the PC 21 controls the turret 39 so that the beam splitter 31 is placed in the light path of the fluorescence and controls the oscillating angles of the wavelength-selecting mirrors 43A and 43B so that fluorescence of the same wavelength is detected by the PMTs 49A and 49B. As for the automatic setting of the image-acquisition conditions, the PC 21 sets the sampling pitch at which the fluorescence from the same area of the specimen S is repeatedly detected, sets the aperture diameter of the pinhole 13, sets the number of summations of the fluorescence image dataset to be summed for each of the PMTs 49A and 49B, and selects the convolutional filter.

The operation of the microscope system 1 configured in this way will now be described.

When creating a super-resolution image of the specimen S with the microscope system 1 according to this embodiment, first, using a mouse, keyboard, or the like (not illustrated), the user manually sets the observation conditions, such as the magnification and NA of the objective lens 7, the wavelength of the laser light, the information about the wavelength selected by the wavelength-selecting mirrors 43A and 43B, the image size, and so forth, and stores them in the storage device 25.

Next, the image quality of the image dataset is adjusted in the normal observation mode.

Image quality adjustment should be performed using the PMT 49A, having the shorter light path, by placing the reflective mirror 32 in the light path of the fluorescence by means of the turret 39. In this case, as shown in FIG. 1, after the laser light emitted from the continuous-wave laser light source 3 passes through the dichroic mirror 9 and is deflected by the scanner 5, it is radiated onto the specimen S by the objective lens 7. Accordingly, the laser light is two-dimensionally scanned on the specimen S according to the oscillating operation of each galvanometer mirror in the scanner 5.

The fluorescence generated in the specimen S as a result of being irradiated with the laser light is collected by the objective lens 7, returns along the light path of the laser light, travels via the scanner 5, and is branched off from the light path of the laser light by the dichroic mirror 9. Then, after the fluorescence is focused by the confocal lens 11 so that a portion thereof passes through the pinhole 13, it is converted to a collimated beam by the collimator lens 15 and enters the detection unit 17.

The fluorescence that has entered the detection unit 17 enters the detection unit 33A via the reflective mirror 27 and the reflective mirror 32 and is dispersed into individual wavelengths by the grating 41A. Then, the fluorescence is reflected by the wavelength-selecting mirror 43A, is focused by the image-forming lens 45A, passes through the slit 47A, and is detected by the PMT 49A.

Next, a light intensity signal corresponding to the luminance detected by the PMT 49A is sent to the PC 21. Then, a fluorescence image dataset of the specimen S is created by the PC 21 on the basis of this light intensity signal and the laser-light scanning position signal, and the created fluorescence image dataset is displayed on a monitor 23. The user adjusts the image quality while looking at the image displayed on the monitor 23.

Next, the user instructs reading of the super-resolution conditions to the PC 21, and the mode is switched to the super-resolution mode.

In the super-resolution mode, the turret 39 is controlled by the PC 21 so that the beam splitter 31 is placed in the light path of the fluorescence, and the oscillating angles of the wavelength-selecting mirrors 43A and 43B are controlled so that fluorescence of the same wavelength is detected by the PMTs 49A and 49B. Also, by the PC 21, the PMT 49B is operated, and the same HV (High Voltage) as that for the PMT 49A is set in the PMT 49B.

Next, the oscillation ranges of the galvanometer mirrors in the scanner 5 are adjusted by the PC 21, and a scanner zoom value is set (for example, 40 nm/Pixel). In addition, the aperture of the pinhole 13 is set to a diameter smaller than one Airy Disk by the PC 21. The summation processing of the fluorescence image datasets is set to an enabled state by the PC 21. The convolutional filter for the computational processing is selected by the PC 21 on the basis of information about the objective lens 7, wavelength information of the excitation light to be radiated, and wavelength information of the fluorescence to be detected, which are stored in the storage device 25.

In this state, acquisition of image datasets is performed by the PC 21.

In the super-resolution mode, similarly to the normal observation mode, the fluorescence generated in the specimen S as a result of being irradiated with the laser light emitted from the continuous-wave laser light source 3 enters the detection unit 17 and is reflected by the reflective mirror 27. Then, the fluorescence is divided into parts of equal intensity, with the same wavelength, by the beam splitter 31 so as to be split into two light paths; the fluorescence in one light path enters the detection unit 33A, and the fluorescence in the other light path enters the detection unit 33B via the reflective mirror 35.

In these detection units 33A and 33B, after the incident fluorescence is dispersed into individual wavelengths by the gratings 41A and 41B and is reflected by the wavelength-selecting mirrors 43A and 43B, it is focused by the image-forming lenses 45A and 45B, and fluorescences having the same wavelengths as each other pass through the slits 47A and 47B and are detected by the PMTs 49A and 49B.

In the super-resolution mode, the scanner 5 is controlled by the PC 21 so that the laser light is repeatedly scanned in the same scanning line in the main scanning direction, and the fluorescence is repeatedly detected by the PMTs 49A and 49B in the same scanning line with a sampling pitch that is set in advance.

In this case, since the fluorescences from the same area of the specimen, obtained by equally dividing the intensity, with the same wavelength, by means of the beam splitter 31, are detected by the PMTs 49A and 49B, respectively, it is possible to acquire, with the PC 21, a plurality of fluorescence image datasets of the specimen S that are substantially identical between the PMTs 49A and 49B, on the basis of the light intensity signals from the PMTs 49A and 49B.

Figure 3:
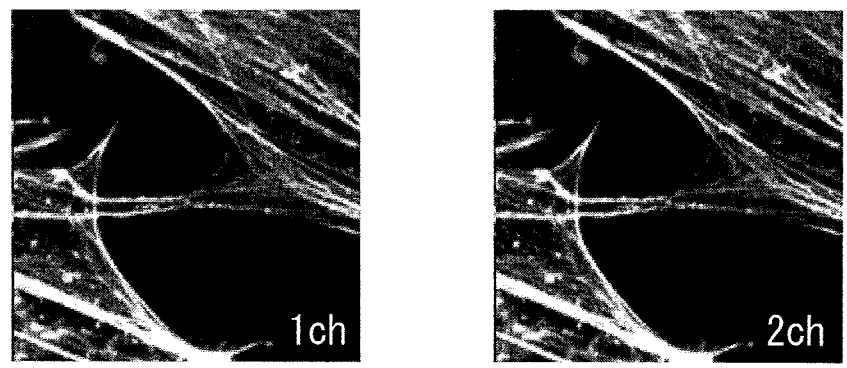
FIG. 3 is a diagram showing an example of photodetector-unit combined image datasets for individual PMTs and a super-resolution image generated using, as a raw image, a final combined image dataset formed by summing and averaging these.
Figure 3:
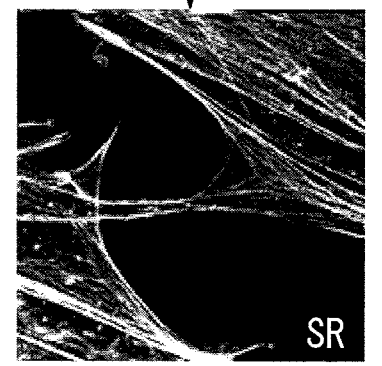

Next, the acquired substantially identical plurality of image datasets of the specimen S for each of the PMTs 49A and 49B are summed and averaged by the PC 21, and two photodetector-unit combined image datasets like those shown in FIG. 3 are created. Also, the created photodetector-unit combined image datasets for each of the PMTs 49A and 49B are summed and averaged by the PC 21, creating a single final combined image dataset. Then, with the created final combined image dataset serving as a raw image, the PC 21 performs image computational processing in which a convolutional filter for enhancing high-frequency components in the final combined image dataset is applied (Convolution).

Next, by repeatedly scanning the laser light in the same area of the specimen S by means of the scanner 5, and detecting the fluorescence from the specimen for each scan of the laser light with the PMTs 49A and 49B, the laser light intensity can be suppressed to a level that does not cause saturation of the PMTs 49A and 49B, and a fixed number of photons or greater can be detected.

Thus, with the PC 21, by summing and averaging the acquired plurality of fluorescence-image datasets for the same area of the specimen, for each of the PMTs 49A and 49B, on the basis of the light intensity signal output from each of the PMTs 49A and 49B, and further summing and averaging the summed and averaged photodetector-unit combined image datasets for each of the PMTs 49A and 49B, it is possible to create a single final combined image dataset having a high proportion of high-frequency components from which photon noise has been removed. Therefore, by performing the image computational processing on this final combined image dataset, it is possible to efficiently enhance high-frequency components in the final combined image dataset.

In this case, when observing a specimen S such as a living cell, since there is a possibility of the observation target moving, if too much time passes, the resolution will be affected; however, with the microscope system 1 according to this embodiment, even though the same area of the specimen S is repeatedly scanned, by splitting the fluorescence from the same area of the specimen S into multiple light paths, with the same wavelength, and simultaneously detecting them with the PMTs 49A and 49B, it is possible to shorten the detection time required for detecting a fixed number of photons or greater. Therefore, it is possible to create a super-resolution image having a desired resolution equal to optical resolution or higher without the resolution being reduced due to the influence of the detection time.

In addition, by using the two PMTs 49A and 49B, it is possible to increase the intensity of the laser light compared with the case of one PMT, thus increasing the number of photons acquired per unit time. By doing so, it is possible to obtain the target resolution with even fewer summations. In addition, since the number of photons detected per unit time by each of the PMTs 49A and 49B does not change, it is possible to prevent an increase in the load on the PMTs 49A and 49B due to an excessive decrease in the HV applied. Since the combining processing time for the photodetector-unit combined image datasets for each of the PMTs 49A and 49B is small (on the order of 10-100 ms) compared with the image-acquisition time of the microscope system 1 (for example, 1 s/frame for 512×512), this embodiment is superior, in terms of time, compared with repeating the summation processing with a single PMT to create a final combined image.

In this embodiment, as one modification, the PC (light-detection-unit gain adjusting control unit) 21 may adjust the HV (photodetector-unit gain) to be applied to the PMTs 49A and 49B so that the PMTs 49A and 49B have approximately the same sensitivities (luminance values) with respect to the number of photons to be detected. In this case, by storing a program for executing the functions of the photodetector-unit gain adjusting and control unit and having the CPU read out and execute this program, the functions of the photodetector-unit gain adjusting and control unit may be realized on the PC 21. Also, the HV (photodetector-unit gain) to be applied to the PMT 49B may be corrected with reference to the HV (photodetector-unit gain) of the PMT 49A for image-quality adjustment.

Figure 4:
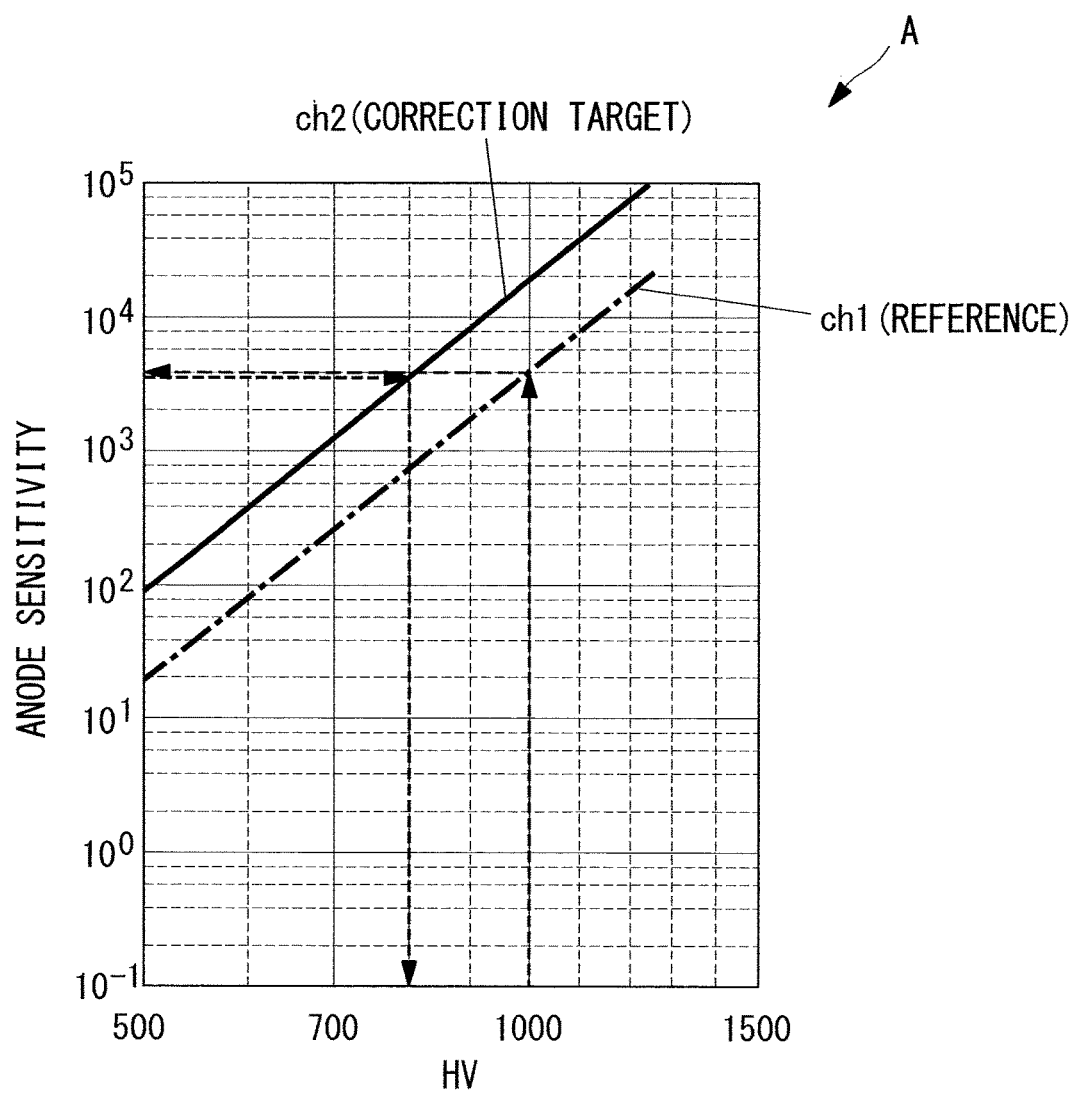
FIG. 4 is a diagram showing an example of a mapping graph showing the distribution of anode sensitivities and HV values for each PMT.

For example, as shown in FIG. 4, a mapping graph A showing the relationship between anode sensitivity values and HV values of the GaAsP detector are stored in the storage device 25, for the PMTs 49A and 49B. In FIG. 4, the anode sensitivity is shown on the vertical axis, and the HV is shown on the horizontal axis.

Next, the HV to be applied to the PMT 49A for ch1, which serves as a reference, is adjusted to optimize the brightness of the image, and the HV for the PMT 49A at this time is read by the PC 21. Next, the anode sensitivity corresponding to the read HV for the PMT 49A for ch1 is specified in the mapping graph A by the PC 21, and the HV for the PMT 49B for realizing the specified anode sensitivity in the PMT 49B for ch2, which is the correction target, is specified. Then, the HV to be applied to the PMT 49B is adjusted to become the HV of the PMT 49B specified on the mapping graph A.

By doing so, when the fluorescences obtained by equally dividing the intensity, with the same wavelength, by means of the beam splitter 31 are detected by the PMTs 49A and 49B, respectively, approximately the same light intensity signals are output from the PMTs 49A and 49B, and the same fluorescence image datasets in the same area of the specimen S can be acquired with the PMTs 49A and 49B.

This is particularly effective in cases where the photodetector-unit combined image datasets for each of the PMTs 49A and 49B are summed and averaged, since it is necessary to make the units of the luminance values consistent.

As described above, the HV for PMT 49B is determined from the HV for PMT 49A using the mapping graph A of the anode sensitivity versus the HVs for the PMTs 49A and 49B; however, the HV for the PMT 49B may be calculated from the HV for the PMT 49A by solving a relational expression for the anode sensitivity versus the HV for each of the PMT 49A and the PMT 49B.

Second Embodiment

Next, a microscope system according to a second embodiment of the present invention will be described.

Figure 5:
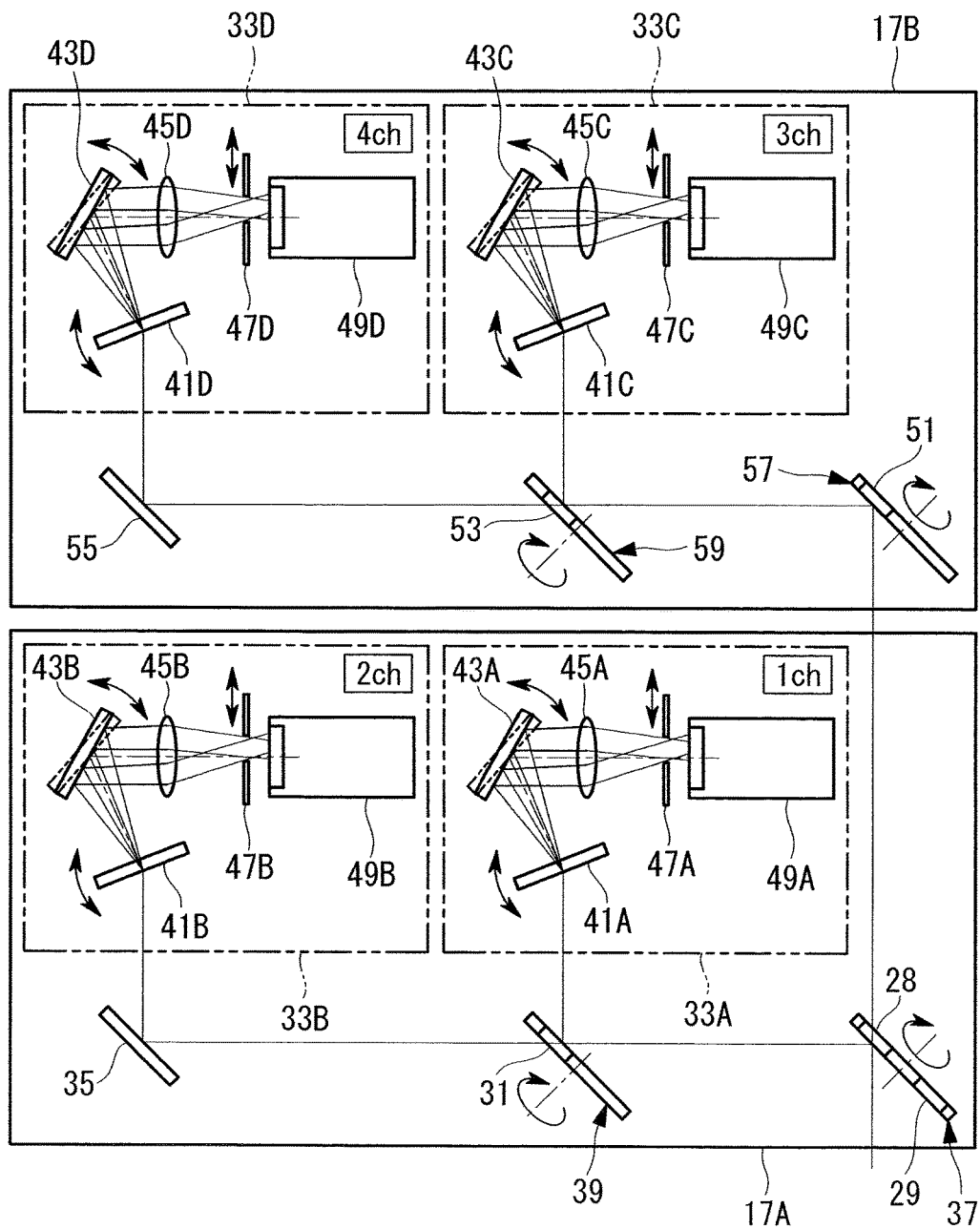
FIG. 5 is a diagram showing, in outline, the configuration of two detection units in a microscope system according to a second embodiment of the present invention.

As shown in FIG. 5, a microscope system 1 according to this embodiment differs from the first embodiment in that it includes a second detection unit 17B in addition to a first detection unit 17A (detection unit 17).

Parts having the same configuration as those in the microscope system 1 according to the first embodiment are assigned the same reference numerals, and a description thereof is omitted.

The first detection unit 17A can divide the fluorescence from the specimen S into equal intensities, with the same wavelength, by means of the beam splitter 28 and can distribute them to the first detection unit 17A and the second detection unit 17B.

The second detection unit 17B includes a reflective mirror 51 that reflects the fluorescence that has passed through the beam splitter 28 in the first detection unit 17A, a beam splitter (light splitting part) 53 that splits the fluorescence reflected by the reflective mirror 51 into two light paths, a detection unit 33C (3ch) that detects the fluorescence in one of the light paths split by the beam splitter 53, a reflective mirror 55 that reflects the fluorescence in the other light path, and a detection unit 33D (4ch) that detects the fluorescence reflected by the reflective mirror 55.

The reflective mirror 51 is held by a turret 57 that can rotate about a prescribed rotation axis, similarly to the reflective mirror 27, and is selectively disposed in the light path of the fluorescence by rotating the turret 57 about the rotation axis.

The beam splitter 53 is held by a turret 59 that can rotate about a prescribed rotation axis, similarly to the beam splitter 31, and is selectively disposed in the light path of the fluorescence by rotating the turret 59 about the rotation axis. This beam splitter 53 divides the fluorescence from the reflective mirror 51 into two equal intensities, with the same wavelength, reflects one of the fluorescences towards the detection unit 33C, and transmits the other fluorescence towards the reflective mirror 55.

The detection unit 33C and the detection unit 33D have the same configurations as those of the detection unit 33A and the detection unit 33B, respectively. Specifically, these detection units 33C and 33D include gratings (light-dispersing elements) 41C and 41D, wavelength-selecting mirrors 43C and 43D, image-forming lenses 45C and 45D, slits 47C and 47D, and PMTs (photodetector units) 49C and 49D.

By changing the oscillating angles of the wavelength-selecting mirrors 43C and 43D about prescribed oscillating axes under the control of the PC 21, it is possible to switch the wavelengths that pass through the slits 47C and 47D among the fluorescences dispersed into each wavelength by the gratings 41C and 41D.

The PMTs 49C and 49D are, for example, GaAsP high-sensitivity detectors, which detect the fluorescences that have passed through the slits 47C and 47D and send light intensity signals corresponding to the luminances of those fluorescences to the PC 21.

The operation of the thus-configured microscope system 1 will now be described.

When creating a super-resolution image of the specimen S with the microscope system 1 according to this embodiment, the user manually sets the observation conditions, such as the magnification and NA of the objective lens 7, the laser wavelength, the selected wavelength information for the wavelength-selecting mirrors 43A, 43B, 43C, and 43D, the image size, and so forth, and adjusts the image using the PMT 49A.

Next, in the super-resolution mode, by means of the PC 21, the turret 59 is controlled to place the beam splitter 53 in the light path of the fluorescence, and the oscillating angles of the wavelength-selecting mirrors 43A, 43B, 43C, and 43D are controlled so that fluorescences of the same wavelength are detected by the PMTs 49A, 49B, 49C, and 49D. In addition, by means of the PC 21, the PMTs 49B, 49C, and 49D are operated, and their HVs are set to be the same as that of the PMT 49A.

In this state, image dataset acquisition is started by the PC 21. The fluorescence generated in the specimen S by irradiation with the laser light emitted from the continuous-wave laser light source 3 enters the first detection unit 17A, where it is divided into equal intensities, with the same wavelength, by means of the beam splitter 28 so as to be split into two light paths. The fluorescence in one light path is further divided into equal intensities, with the same wavelength, by the beam splitter 31 so as to be split into two light paths, and these are detected by the PMTs 49A and 49B, respectively, similarly to the first embodiment.

The fluorescence in the other light path enters the second detection unit 17B and is reflected by the reflective mirror 51. Then, the fluorescence is divided into equal intensities, with the same wavelength, by the beam splitter 53 so as to be split into two light paths; the fluorescence in one light path enters the detection unit 33, and the fluorescence in the other light path enters the detection unit 33D via the reflective mirror 55.

After the fluorescences that have entered these detection units 33C and 33D are dispersed into each wavelength by the gratings 41C and 41D, respectively, and are reflected by the wavelength-selecting mirrors 43C and 43D, they are focused by the image-forming lenses 45C and 45D. Then, fluorescences having the same wavelength as each other pass through the slits 47C and 47D and are detected by the PMTs 49C and 49D.

In this embodiment also, under the control of the PC 21, the laser light is repeatedly scanned in the same scanning line on the specimen S, and with the PMTs 49A, 49B, 49C and 49D, the fluorescence is repeatedly detected in each scanning line at a sampling pitch that is set in advance.

In this case, since the fluorescences from the same area of the specimen, which are obtained by equally dividing the intensity, with the same wavelength, by means of the beam splitters 28, 31, and 53 are detected by the PMTs 49A, 49B, 49C, and 49D, a plurality of fluorescence image datasets of the specimen S which are substantially equal at the PMTs 49A, 49B, 49C, and 49D can be obtained by the PC 21.

Figure 6:
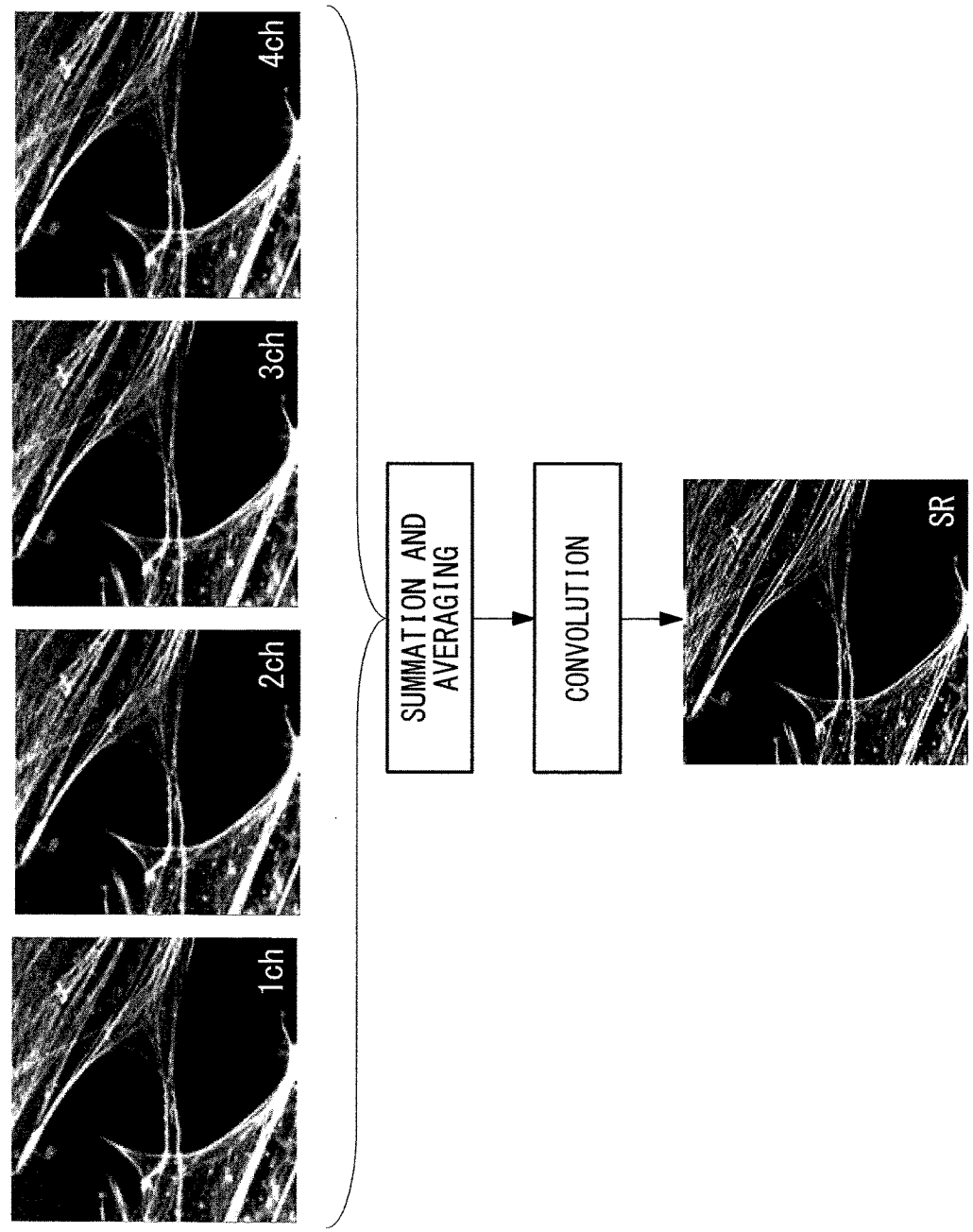
FIG. 6 is a diagram showing an example of photodetector-unit combined image datasets for four PMTs and a super-resolution image generated by using, as a raw image, a final combined image dataset formed by summing and averaging these.

Next, the obtained plurality of image datasets for the same area of the specimen S are summed and averaged for each of the PMTs 49A, 49B, 49C, and 49D by the PC 21, and four photodetector-unit combined image datasets like those shown in FIG. 6 are created. In addition, the created photodetector-unit combined image datasets for each of the PMTs 49A, 49B, 49C, and 49D are summed and averaged by the PC 21, so that a single final combined image dataset is created, and a super-resolution image is created, with this final combined image dataset serving as a raw image.

With the microscope system 1 according to this embodiment, described above, the fluorescence from the same area of the specimen S is divided into equal intensities, with the same wavelength, so as to be split into multiple light paths, and by detecting these at approximately the same time with the four PMTs 49A, 49B, 49C, and 49D, respectively, it is possible to detect the photons of intense fluorescence in an even shorter time.

This embodiment detects fluorescences of the same wavelength with the PMTs 49A, 49B, 49C, and 49D by using the beam splitter 28. Instead of this, for example, it may detect fluorescences of different wavelengths in the first detection unit 17A and the second detection unit 17B by using the dichroic mirror (light-distributing part, see FIG. 5) 29 which distributes the fluorescence from the specimen S to each of the detection units 17A and 17B according to the wavelength.

In this case, the same HV values should be set in the PMTs that detect the fluorescence of the same wavelength, that is, in the PMTs 49A and 49B and in the PMTs 49C and 49D. In addition, the dichroic mirror 29 should be disposed in the light path of the fluorescence so that the fluorescence from the specimen S is distributed to the first detection unit 17A and the second detection unit 17B according to the wavelength. Thus, in each of the detection units 17A and 17B, fluorescences of different wavelengths are respectively divided into equal intensities, with the same wavelength, by the beam splitter 31 or the beam splitter 53 so as to split the light path into two, and these are respectively detected by the PMTs 49A and 49B or the PMTs 49C and 49D.

In this modification, since the fluorescence at one of the wavelengths, which is split into equal intensities, with the same wavelength, by the beam splitter 31, is detected by the PMTs 49A and 49B in the first detection unit 17A, and the fluorescence at the other wavelength, which is split into equal intensities, with the same wavelength, by the beam splitter 53, is detected by the PMTs 49C and 49D in the second detection unit 17B, in the PC 21, on the basis of the light intensity signals from these PMTs 49A, 49B, 49C, and 49D, it is possible to obtain approximately the same fluorescence image datasets of the specimen S for each of the PMTs 49A and 49B and each of the PMTs 49C and 49D.

Figure 7:
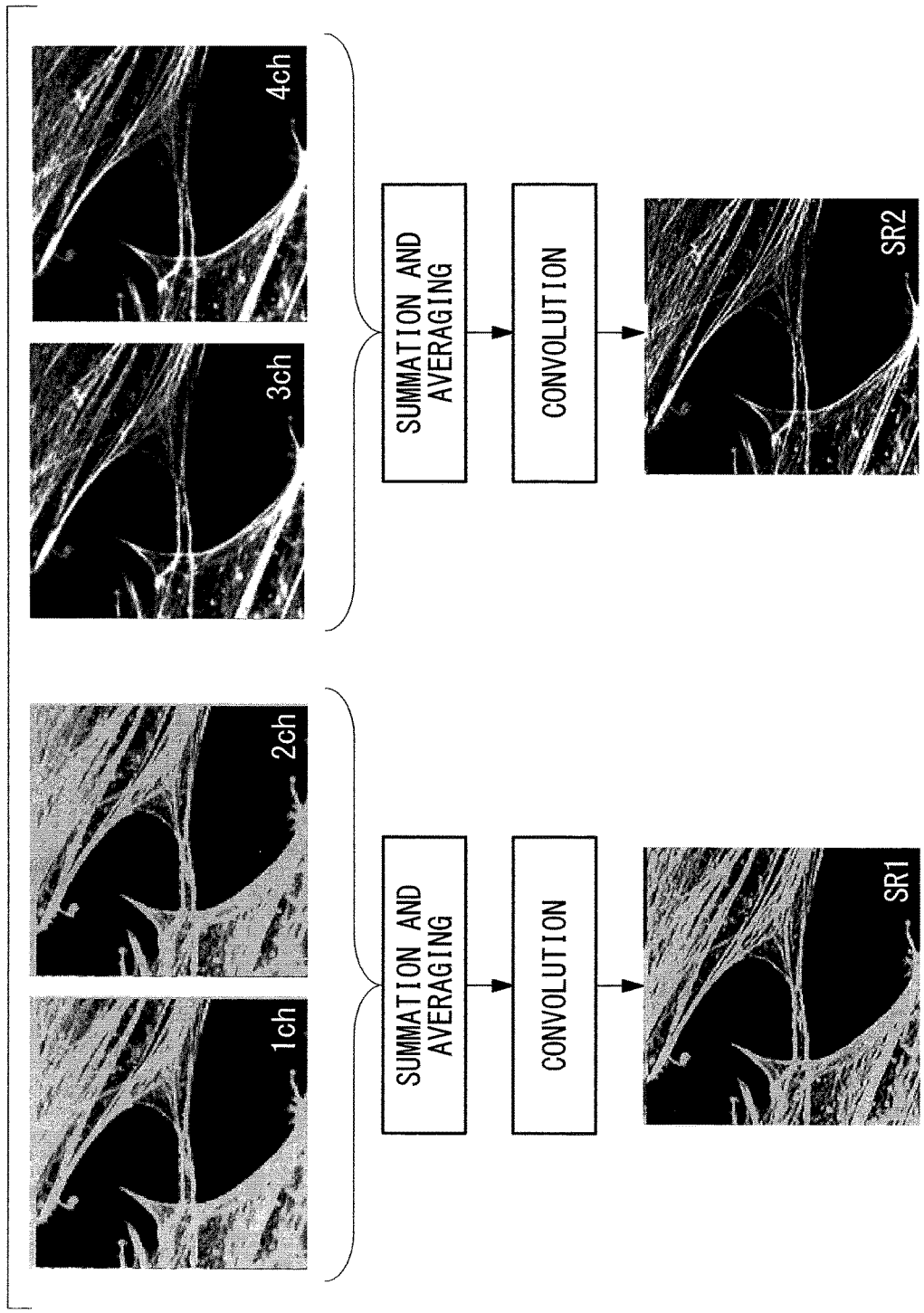
FIG. 7 is a diagram showing an example of photodetector-unit combined image datasets for two groups of PMTs having different detection wavelengths in respective detection units and super-resolution images generated by using, as raw images, final combined image datasets, formed by summing and averaging these for each detection wavelength.

In this case, as shown in FIG. 7, the obtained image datasets for the same area of the specimen S for the PMTs 49A and 49B and the PMTs 49C and 49D should be summed and averaged by the PC 21 to create two photodetector-unit combined image datasets each, and the created photodetector-unit combined datasets for the PMTs 49A and 49B and the PMTs 49C and 49D should be summed and averaged to create one final combined image dataset each. Then, respective super-resolution images should be created by the PC 21, with the final combined image dataset for the PMTs 49A and 49B and the final combined image dataset for the PMTs 49C and 49D serving as raw images.

With this modification, the fluorescence from the same area of the specimen S is split into a plurality of light paths according to wavelength, and by equally dividing the intensity and detecting the fluorescence of the same wavelength approximately simultaneously in the PMTs 49A and 49B and by equally dividing the intensity and detecting the fluorescence of another same wavelength approximately simultaneously in the PMTs 49C and 49D, it is possible to detect the photons of intense fluorescence at each wavelength in a short time, and to create super-resolution images of different wavelengths and having a desired resolution equal to optical resolution or higher.

Third Embodiment

Next, a microscope system according to a third embodiment of the present invention will be described.

Figure 8:
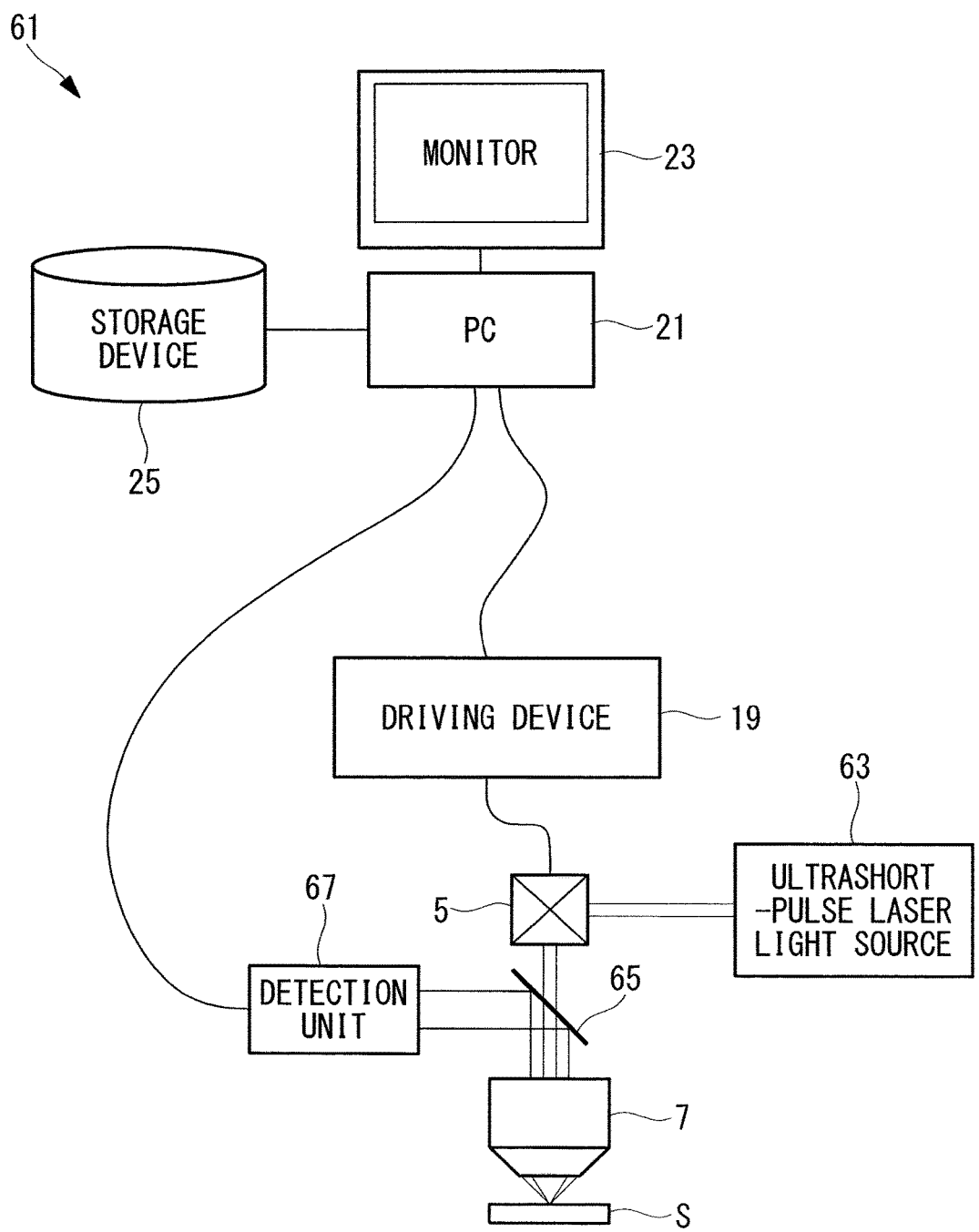
FIG. 8 is a diagram showing, in outline, the configuration of a microscope system according to a third embodiment of the present invention.

As shown in FIG. 8, a microscope system 61 according to this embodiment differs from the microscope system 1 according to the first embodiment, which has a configuration for performing single-photon excitation observation, in that it has a configuration for performing multi-photon excitation observation.

In the following, parts having the same configuration as those in the microscope system 1 according to the first embodiment are assigned the same reference numerals, and a description thereof is omitted.

The microscope system 61 includes, in place of the detection unit 17, the continuous-wave laser light source 3, and the dichroic mirror 9, an ultrashort-pulse laser light source (light source) 63 that generates short-pulse laser light (hereinafter referred to as laser light), a dichroic mirror (light branching part) 65 that branches off the fluorescence coming from the specimen S from the light path of the laser light, without it returning to the scanner 5, and a detection unit 67.

The dichroic mirror 65, which is placed between the scanner 5 and the objective lens 7, transmits the laser light from the scanner 5 towards the objective lens 7 and reflects the fluorescence coming from the specimen S and collected by the objective lens 7 towards the detection unit 67.

Figure 9:
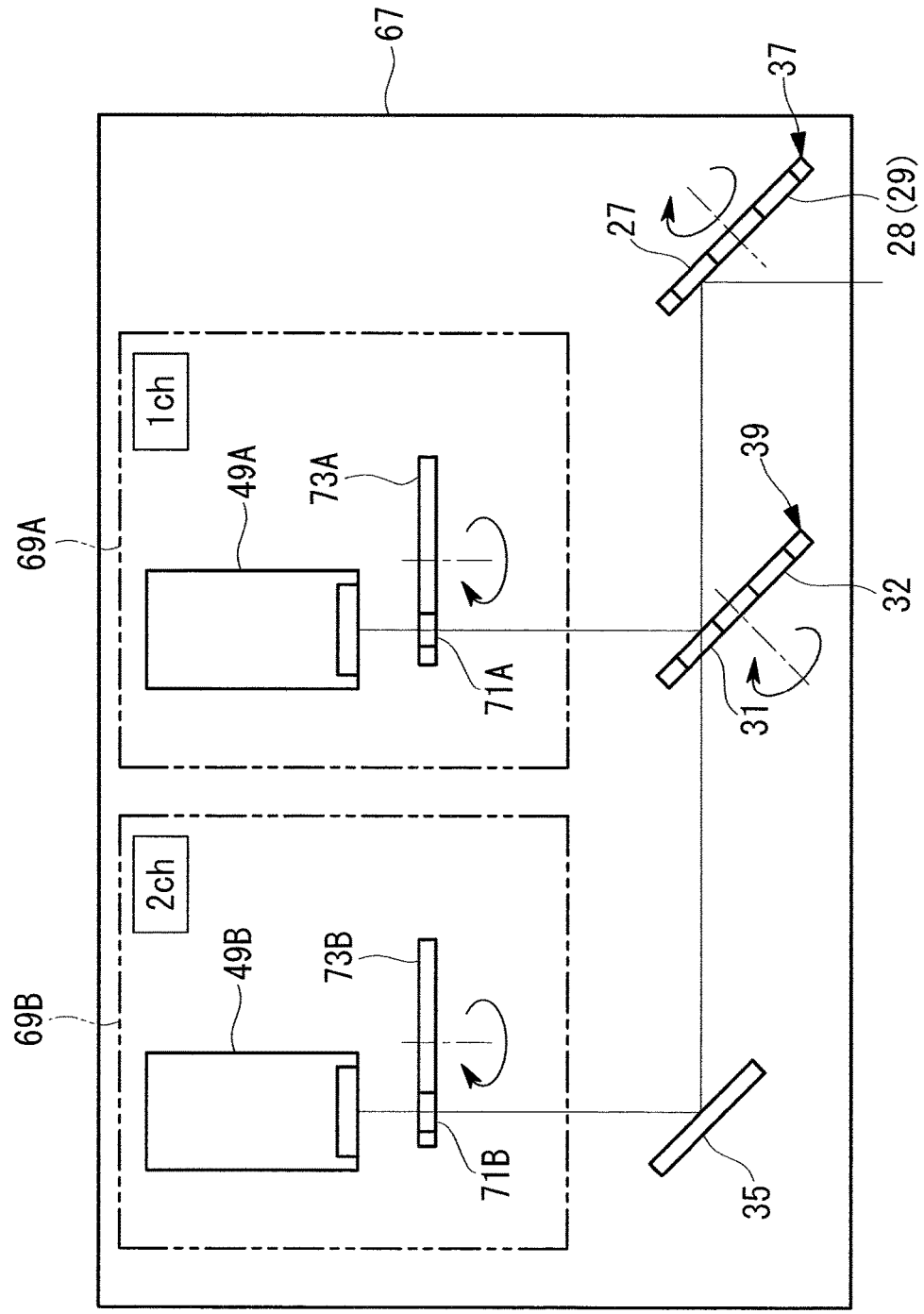
FIG. 9 is a diagram showing, in outline, a detection unit in FIG. 8.

As shown in FIG. 9, the detection unit 67 includes a reflective mirror 27, a beam splitter 31, a reflective mirror 35, a detection unit 69A (1ch), and a detection unit 69B (2ch).

The detection unit 69A and the detection unit 69B have the same configuration as each other. Specifically, these detection units 69A and 69B include wavelength-selecting filters 71A and 71B, turrets 73A and 73B that hold these wavelength-selecting filters 71A and 71B, and PMTs 49A and 49B.

The turrets 73A and 73B are provided so as to be rotatable about prescribed rotation axes and, by being rotated about the rotation axes, can dispose the wavelength-selecting filters 71A and 71B in the light path of the fluorescence.

The operation of the thus-configured microscope system 61 will now be described.

When creating a super-resolution image of the specimen with the microscope system 61 according to this embodiment, the turrets 73A and 73B are controlled by the PC 21 so that the wavelength-selecting filters 71A and 71B are disposed in the light paths of the fluorescence.

In this state, after the laser light emitted from the ultrashort-pulse laser light source 63 is transmitted through the dichroic mirror 65 towards the scanner 5, it is radiated onto the specimen by the objective lens 7. After the fluorescence generated at the focal position of the objective lens 7 in the specimen S due to irradiation with the laser light is collected by the objective lens 7, it is branched off from the light path of the laser light by the dichroic mirror 65 without returning to the scanner 5 and enters the detection unit 67.

The fluorescence that has entered the detection unit 67 is reflected by the reflective mirror 27 and is divided into equal intensities, with the same wavelength, by the beam splitter 31 so as to be split into two light paths. Then, of the fluorescence in one light path reflected by the beam splitter 31, the fluorescence transmitted through the wavelength-selecting filter 71A is detected by the PMT 49A, and of the fluorescence in the other light path, transmitted through the beam splitter 31 and reflected by the reflective mirror 35, the fluorescence transmitted through the wavelength-selecting filter 71B is detected by the PMT 49B.

Similarly to the first embodiment, a plurality of fluorescence image datasets for the same area of the specimen S are obtained by the PC 21 on the basis of the light intensity signal output from each of the PMTs 49A and 49B, and these fluorescence image datasets are summed and averaged for each of the PMTs 49A and 49B. In addition, photodetector-unit combined datasets for each of the PMTs 49A and 49B are summed and averaged, so that a single final combined image dataset is created, and a super-resolution image is created with this final combined image dataset serving as a raw image.

As described above, with the microscope system 61 according to this embodiment, via multi-photon excitation observation, it is possible to create a super-resolution image having a desired resolution equal to optical resolution or higher and to observe the specimen S.

Although embodiments of the present invention have been described above with reference to the drawings, the specific configuration is not limited to these embodiments, and design changes that do not depart from the scope of the present invention are also encompassed. For example, this embodiment has been described in terms of an example in which the beam splitters 31, 28, and 53 which divide the fluorescence into equal intensities, with the same wavelength, are used as the light splitting parts; instead of this, however, beam splitters that split the fluorescence into intensities of different ratios may be employed. In addition, although the two detection units 17A and 17B have been illustrated as examples of the detection units, three or more detection units may be employed, the fluorescence from the specimen may be distributed to each detection unit by the light-distributing parts, and fluorescences having the same wavelength or different wavelengths may be detected approximately simultaneously by these detection units.

In the embodiments of the present invention, for example, half mirrors having a transmittance and a reflectance of 50% in all fluorescence wavelength regions regardless of the wavelength of the incident light may be used as the beam splitters (light splitting parts). In addition, reflected light in each region may be made incident on each detector by using mirrors having reflection directions that differ depending on the region. Moreover, the reflected light and transmitted light in respective regions may be made incident on each detector by using a mirror whose reflection region and transmission region are set.

In each of the embodiments described above, the PC sums and averages the obtained plurality of image datasets for the same area of the specimen for each PMT (photodetector unit) to create photodetector-unit combined image datasets, and further sums and averages the created photodetector-unit combined image datasets for each PMT (photodetector unit) to create a final combined image dataset; however, the PC 21 may create the final combined image dataset by summing and averaging a plurality of image datasets for the same area of the specimen S obtained in each PMT (photodetector unit).

Figure 10:
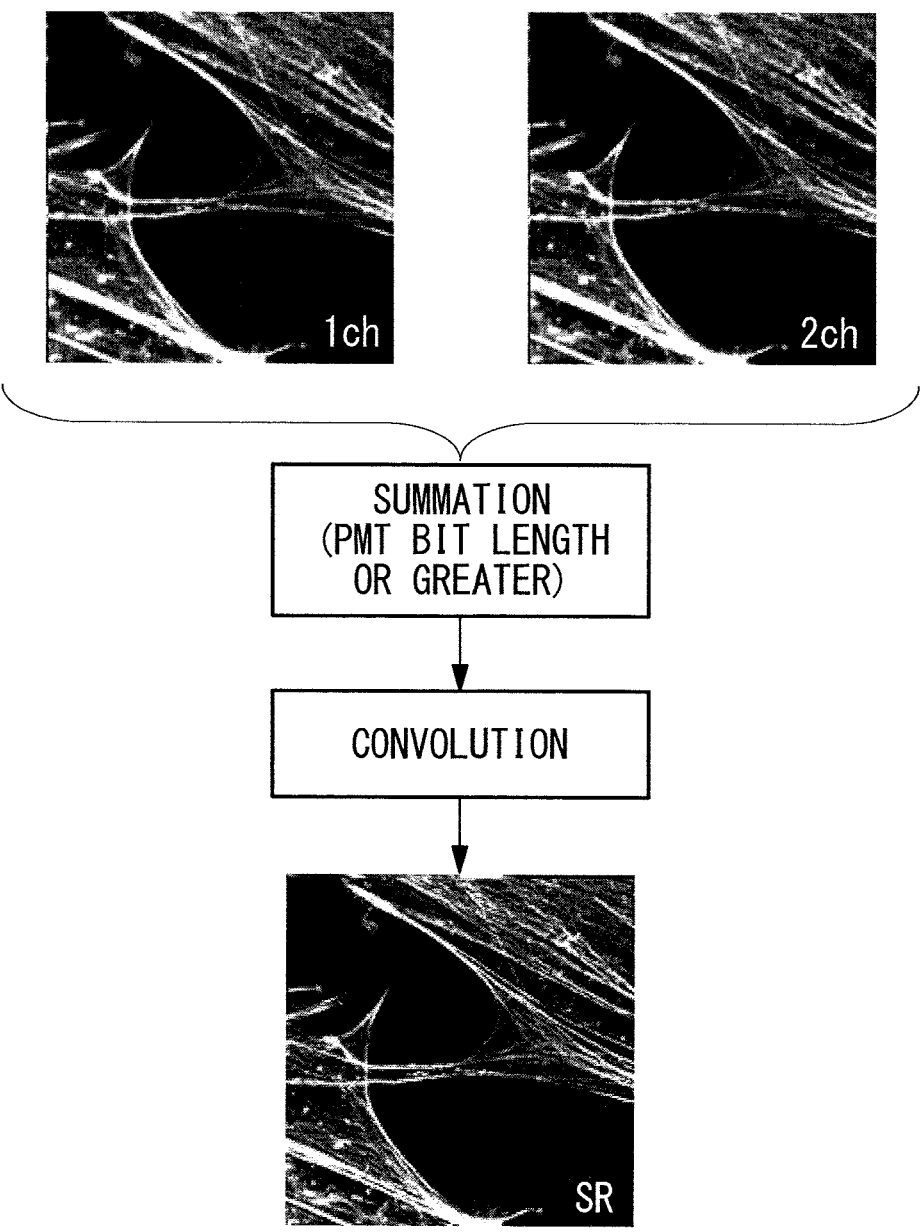
FIG. 10 is a diagram showing, as a modification of each of the embodiments of the present invention, an example of photodetector-unit combined image datasets for each PMT and a super-resolution image generated using a final combined image dataset, formed by summing these, as a raw image.

In each of the embodiments described above, the PC sums and averages the obtained plurality of image datasets for the same area of the specimen for each PMT (photodetector unit) to create the photodetector-unit combined image datasets and sums and averages the created photodetector-unit combined image datasets for each PMT (photodetector unit) to create a final combined image dataset; however, instead of summing and averaging, as shown in FIG. 10, the obtained plurality of image datasets for the same area of the specimen may be summed for each PMT (photodetector unit) to create the photodetector-unit combined image datasets, and the created photodetector-unit combined image datasets for each PMT (photodetector unit) may be summed to create the final combined image dataset.

In such cases too, it is possible to create a final combined image dataset having a higher proportion of high-frequency components compared with each fluorescence image dataset in the same area of the specimen for each PMT (photodetector unit), obtained by the PC.

The photodetector-unit combined image dataset in the case where summation is performed and the final combined image dataset created by summing the photodetector-unit combined image datasets are combined image datasets having a bit length larger than the bit length possessed by a single image dataset obtained by the PMT (photodetector unit)

REFERENCE SIGNS LIST 1, 61 Microscope system
3 Continuous-wave laser light source (light source)
5 Scanner (scanning unit)
7 Objective lens
13 Pinhole
17, 67 Detection unit
17A First detection unit (detection unit)
17B Second detection unit (detection unit)
21 PC (image-dataset acquisition unit, image-dataset combining unit, computational processing unit, light-detector gain adjusting and control unit)
28 Beam splitter (light-distributing part)
29 Dichroic mirror (light-distributing part)
31 Beam splitter (light-splitting part)
49A, 49B, 49C, 49D PMT (photodetector unit)
53 Beam splitter (light-splitting part)
63 Ultrashort-pulse laser light source (light source)
S Specimen

The invention claimed is:

1. A microscope system comprising:
  a scanner configured to scan continuous-wave laser light emitted from a light source on a specimen;
  an objective lens configured to irradiate the specimen with the continuous-wave laser light, which is scanned by the scanner, and to collect return light returning from the specimen;
  a pinhole having an opening at a position that is optically conjugate with a focal position of the objective lens and that allows the return light collected by the objective lens and descanned by the scanner to partially pass therethrough;
  a beam splitter configured to split the return light from the specimen that has passed through the pinhole into a plurality of light paths with the same wavelength;
  a plurality of photodetectors that respectively detect the return light in the light paths split by the beam splitter and output light intensity signals corresponding to the luminances of the return light; and
  a processor which is configured to execute a program to perform operations comprising:
    controlling the scanner to repeatedly scan the laser light on a same area of the specimen;
    acquiring, for each of the photodetectors, a plurality of image datasets of the same area of the specimen based on the light intensity signals of the return light from the same area of the specimen, detected by the photodetectors for each scan;

combining the plurality of image datasets for the same area of the specimen, to create a final combined image dataset; and subjecting the final combined image dataset, obtained by combining the image datasets, to image computational processing for enhancing high-frequency components.

2. A microscope system according to claim 1, wherein the processor sums and averages the acquired plurality of image datasets for the same area of the specimen from each of the photodetectors, to create the final combined image dataset for the same area of the specimen.

3. A microscope system according to claim 1, wherein the processor creates a photodetector combined image dataset for each of the photodetectors by summing or by summing and averaging the acquired plurality of image datasets for the same area of the specimen, for each of the photodetectors, and creates the final combined image dataset for the same area of the specimen by summing or by summing and averaging the created plurality of photodetector combined image datasets.

4. A microscope system according to claim 1, wherein the operations performed by the processor further comprise adjusting gains of the photodetectors so that sensitivity characteristics of the photodetectors with respect to a number of photons to be detected are approximately the same.

5. A microscope system according to claim 4, wherein the processor sets the gain of one of the photodetectors based on the gain of another one of the photodetectors so that the sensitivity characteristics of the plurality of photodetectors with respect to the number of photons to be detected are approximately the same.

6. A microscope system according to claim 1, further comprising:

a plurality of groups of photodetectors, each group of photodetectors comprising a plurality of the photodetectors, wherein said beam splitter is a first beam splitter provided to one of the groups of photodetectors, and a second beam splitter is provided to another one of the groups of photodetectors; and a third beam splitter that distributes the return light coming from the specimen to the plurality of groups of photodetectors with the same wavelength.

7. A microscope system according to claim 1, further comprising:

a plurality of groups of photodetectors, each group of photodetectors comprising a plurality of the photodetectors, wherein said beam splitter is a first beam splitter provided to one of the groups of photodetectors, and a second beam splitter is provided to another one of the groups of photodetectors; and a part dichroic mirror that distributes the return light coming from the specimen to the plurality of groups of photodetectors according to wavelength.

8. A microscope system according to claim 1, wherein the processor sets a gain of one of the photodetectors based on a gain of another one of the photodetectors.

9. A microscope system comprising:

scanning means for scanning continuous-wave laser light emitted from a light source on a specimen;

an objective lens configured to irradiate the specimen with the continuous-wave laser light, which is scanned by the scanning means, and to collect return light returning from the specimen;

a pinhole having an opening at a position that is optically conjugate with a focal position of the objective lens and that allows the return light collected by the objective lens and descanned by the scanning means to partially pass therethrough;

light splitting means for splitting the return light from the specimen that has passed through the pinhole into a plurality of light paths with the same wavelength;

a plurality of photodetector means for respectively detecting the return light in the light paths split by the light splitting means and output light intensity signals corresponding to the luminances of the return light;

image-dataset acquisition means for, for each of the photodetector means, acquiring an image dataset of the specimen based on the light intensity signal;

image-dataset combining means for controlling the scanning means to repeatedly scan the laser light on a same area of the specimen, and for combining a plurality of image datasets for the same area of the specimen which are acquired by the image-dataset acquisition means based on the light intensity signals of the return light from the same area of the specimen detected by the photodetector means for each scan; and computational processing means for subjecting a final combined image dataset, obtained by combining the image datasets with the image-dataset combining means, to image computational processing for enhancing high-frequency components.

10. A microscope system according to claim 9, wherein the image-dataset combining means sums or sums and averages the acquired plurality of image datasets for the same area of the specimen, from each of the photodetector means, to create the final combined image dataset for the same area of the specimen.

11. A microscope system according to claim 9, wherein the image-dataset combining means creates a photodetector-means combined image dataset for each of the photodetector means by summing or by summing and averaging the acquired plurality of image datasets for the same area of the specimen, for each of the photodetector means, and creates the final combined image dataset for the same area of the specimen by summing or by summing and averaging the created plurality of photodetector-means combined image datasets.

12. A microscope system according to claim 9, further comprising photodetector-means gain adjusting and control means for adjusting gains of the photodetector means so that sensitivity characteristics of the photodetector means with respect to a number of photons to be detected are approximately the same.

13. A microscope system according to claim 12, wherein the photodetector-means gain adjusting and control means sets the gain of one of the photodetector means based on the gain of another one of the photodetector means so that the sensitivity characteristics of the plurality of photodetector means with respect to the number of photons to be detected are approximately the same.

14. A microscope system according to claim 9, further comprising:

a plurality of detection means, each of the detection means comprising a plurality of the photodetector means and the light splitting means; and light-distributing means for distributing the return light coming from the specimen to the plurality of detection means with the same wavelength.

15. A microscope system according to claim 9, further comprising:
- a plurality of detection means, each of the detection means comprising a plurality of the photodetector means and the light splitting means; and
- light-distributing means for distributing the return light coming from the specimen to the plurality of detection means according to wavelength.

16. A microscope system according to claim 9, further comprising photodetector-means gain adjusting and control means for setting a gain of one of the photodetector means based on a gain of another one of the photodetector means.

* * * * *